March 7, 1950     H. T. HODGES     2,500,034

CAMERA SHUTTER TRIGGER LATCH AND STOP

Filed Feb. 24, 1949

HOWARD T. HODGES
*INVENTOR*

BY Daniel I. Mayne
    Donald H. Stewart
*ATTORNEYS*

Patented Mar. 7, 1950

2,500,034

UNITED STATES PATENT OFFICE 2,500,034

CAMERA SHUTTER TRIGGER LATCH AND STOP

Howard T. Hodges, Rochester, N. Y., assignor to Eastman Kodak Company, Rochester, N. Y., a corporation of New Jersey Application February 24, 1949, Serial No. 78,115

3 Claims. (Cl. 95—53)

This invention relates to photography, and more particularly to camera shutters. One object of the invention is to provide a camera shutter with a shutter trigger lock and a master member stop without the use of additional parts. A still further object of my invention is to provide a simple and inexpensive means of preventing the operation of the trigger unless the shutter has first been set. A still further object of my invention is to provide a means for limiting the movement of the master member under the impulse of its spring and in a driving direction, said stop means also being arranged without additional parts. Other objects will appear from the following specification, the novel features being particularly pointed out in the claims at the end thereof.

I am aware that trigger locks are not broadly new, examples of such trigger locks being shown in U. S. Patent 2,105,228, Riddell, granted January 11, 1938; 2,183,802, Zizelsberger, granted December 19, 1939; and 2,267,518, Burger, granted December 23, 1941. However, in each of these patents additional parts and additional movements are required and, in addition, the trigger latch itself does not include a stop member so that the construction is quite different.

Coming now to the drawings wherein like reference characters denote like parts throughout:

Figure 1:
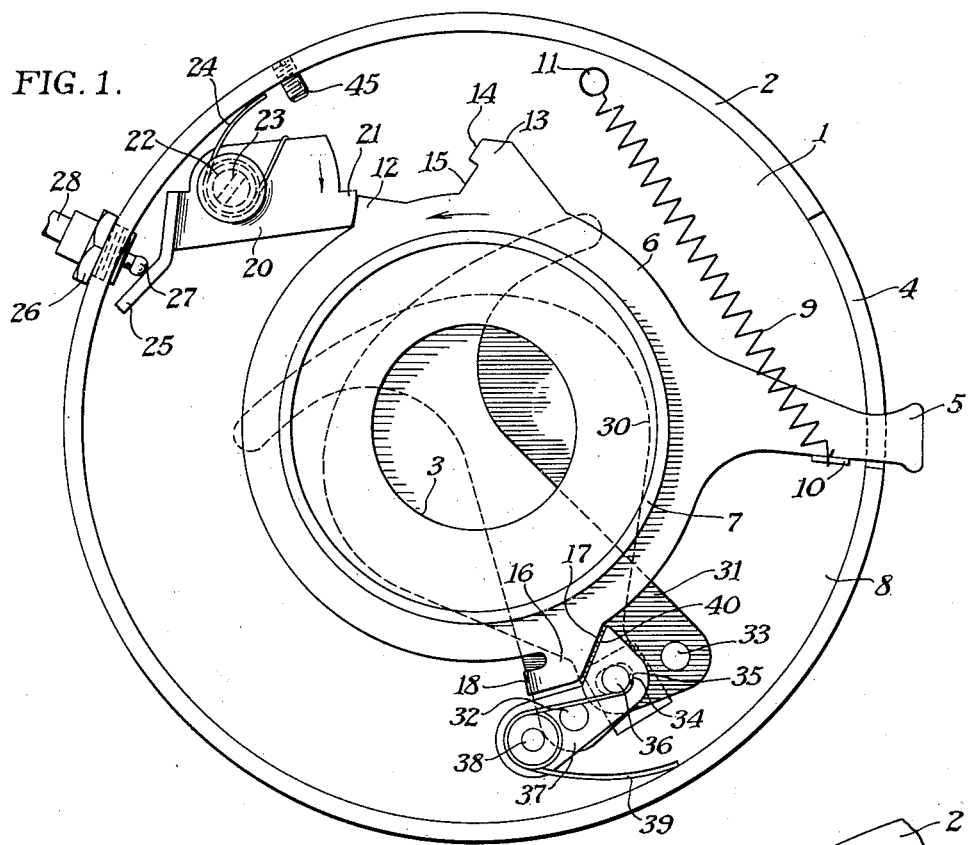
Fig. 1 is a top plan view of a typical inexpensive shutter with the cover plate removed showing a master member and trigger constructed in accordance with and embodying a preferred form of my invention. The parts are shown with the shutter set and in position to make an exposure.

My invention consists in providing a shutter trigger and a master member with suitable interengaging parts so that without the use of additional parts, a shutter trigger lock, a latch for holding the master member in a set position, and a stop for limiting the movement of the master member are all provided. This structure is intended primarily for an inexpensive shutter, the essential parts of which are shown in the drawing, but, of course, such a shutter may have the usual gear train, or retard, for producing delayed instantaneous speeds, if desired.

Referring to Fig. 1, the shutter may consist of a casing 1 having an upstanding flange 2 around its periphery, and an exposure aperture 3 in the center. The flange 2 may be slotted at 4 so that an operating handle 5 of a master member 6 may project therethrough. This master member is in the form of a ring and is mounted to turn freely on the annular member 7 which may form a part of a mechanism plate 8. A spring 9 connects a lug 10 on the handle 5 to a stud 11 and furnishes the power for driving the master member in the direction shown by the arrow in Fig. 1 to make an exposure.

The master member has a latching lug 12, an offset arm 13 which includes a stop surface 14, and is recessed at 15 for a trigger latch element and driving lug 16. This driving lug has a cam surface 17 and is formed upwardly at 18.

In order to hold the master member 6 in its set position shown in Fig. 1, a trigger member 20 is provided with a latch element 21; this latch element engaging the latch element 12 on the master member. The trigger 20 in the present instance is mounted to turn a shaft 22 which is provided with a slot 23 to which the end of a shaft passing outwardly from a camera may engage, so that the trigger member 20 may be turned from such a shaft. A spring 24 tends to turn the trigger member in the direction shown by the arrow and toward the master member 6. The trigger is preferably provided with an arm 25 lying beneath a cable release ferrule 26 so that the plunger of the release 27, passing through a cable 28, may be used to operate the trigger in a known manner. Fig. 1 shows the master member latched and ready to make an exposure. In the present instance the shutter is provided with two similar right and left-hand shutter blades 30 and 31 pivoted to the casing on studs 32 and 33. One shutter blade is provided with a slot 34 and the other shutter blade is provided with a round opening or slot 35, both of these openings being engaged by a pin 36 carried by an opening lever 37. This opening lever is pivoted to a stud 38 and includes a spring 39 normally holding the shutter blades in the closed position. The outer end of lever 37 is provided with a cam surface 40 which, in the set position of the master member shown in Fig. 1, lies in the path of the cam 17 of the master member. Therefore, if the trigger 20 is depressed, or turned in a direction opposite to the arrow in Fig. 1, latch element 21 releases latch element 12 and the master member, under the influence of spring 9, turns in a counterclockwise direction so that the cam 17, through engagement with cam 40, will turn the opening lever 37, and since this lever carries a stud 34, both blades will be opened during this movement. As soon as the master member lug 16 passes the opening lever, the spring 39 closes the blade and an exposure is made. Meanwhile, the trigger may be held in a depressed position, or it may have returned to its rest position in which it engages the periphery of the master member 6. In either case the arm 21 of the lever 20 forms a stop to limit the movement of the master member. If the trigger 20 is held in a depressed position, the stop surface 14 of the master member will strike the end of the arm 21, thus bringing the movement of the master member to a stop. When this occurs, the blades have already opened and been closed by the spring 39 passing the lug 16. Therefore, if the trigger is allowed to return to its initial position, the arm 21 will ride down the surface 14 under the impulse of spring 24 and will drop into the recessed portion 15 of the master member since the master member, under its spring 9, may move in a slightly further direction to the position shown in Fig. 3. The trigger member is now latched. If the trigger should have returned so that arm 21 is in engagement with the master member 6, before the master member 6 completes its movement, the parts may be in the position shown in Fig. 2, so that slight further movement of the master member 6 will engage the recessed area 15 with the arm 21 so that this arm will be latched. Thus, it is immaterial what position the trigger is in—it will always serve as a stop for the master member and, in addition, when the trigger returns to its normal position by reason of the spring 24, regardless of the position of the arm 21 when stopping the master member, it will immediately move to its latched position of Fig. 3. This is accomplished without an additional part, and since the shutter trigger and the master member are both formed from thin sheet metal stamped out, the construction is quite inexpensive, although effective. The master member and trigger move in the same plane, and at no time does a portion of the shutter or the trigger spring up and pass over the top of the other part. The trigger moves away from the master member in an exposure-making direction, but it cannot move out of the path of the lug 13, so that its rest position, which may be controlled by a set screw 45, when depressed is always within the path of the lug 13.

Figure 2:
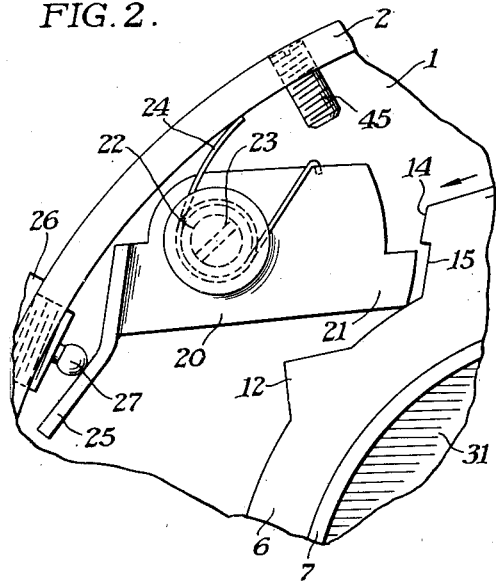
Fig. 2 is an enlarged fragmentary detailed view showing the trigger latch and stop in a position they may assume just before the master member comes to rest after making an exposure.
Figure 3:
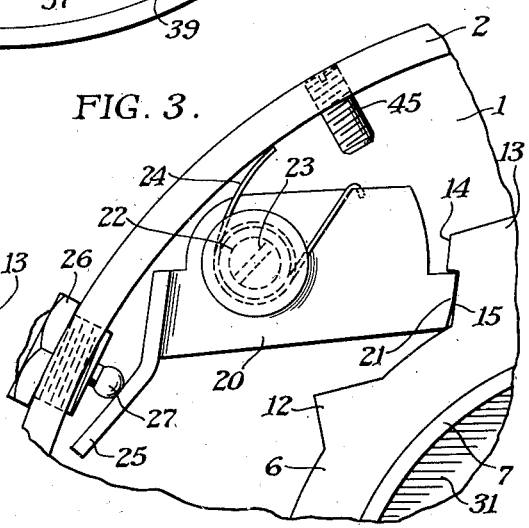
Fig. 3 is a view similar to Fig. 2 with the parts in their rest and unset position after an exposure has been made.

The operation of my improved shutter trigger latch and stop is as follows. To make an exposure the handle 5 is moved through the slot 4 until the arm 21 engages the lug 12 and latches the master member in its set position. During this movement the incline 18 moves up and over the opening lever 37 and when fully set the cam 17 lies adjacent to the cam 40 on the opening lever. The relationship of these two cams is not critical; they may either lie in contact or they may be spaced some distance from each other. In any event, when the trigger 20 is turned in a clockwise direction against the action of spring 24, cam 17 strikes cam 40, swinging the opening lever 37 towards the periphery of the shutter and opening the shutter blades which will close when the lug 16 has passed the end of the opening lever. The spring 39 then closes the blades. After lug 16 passes the end of lever 37, the master member continues to move until either the surface 14, or the recessed surface 15, strikes the arm 21 of the trigger to come to rest. If the surface 14 strikes the trigger arm 21, when the trigger is released, the spring 24 will drive this arm in the direction shown by the arrow in Fig. 1 until it drops into the notch 15. If, however, the trigger returns to its rest position first, as shown in Fig. 2, it will immediately engage the recessed area 15. In any event the recessed area 15 latches the trigger against further movement until the master member is moved in a setting direction, as indicated in Fig. 1. The first part of this movement will release the trigger arm 21 from the recessed area 15, but since the setting must be complete before the lug 12 snaps behind the trigger arm 21, if the setting lever should be released at any time previous to this locking engagement, the parts will immediately return to their latched position.

With this construction it will be noted that the speed of movement of the master member is unimportant, because the trigger, by moving away from the master member and by remaining in the path of the lug 13, will always release the shutter and will always be in a position to form a stop for the master member whether in an operative latching position, or in a releasing position.

Having thus described my invention, what I desire to secure by Letters Patent is:

1. A shutter trigger lock and stop for camera shutters of the type including an apertured shutter casing, pivoted blades covering the aperture, mechanism for moving the blades including a master member and a handle for setting the master member, a latch element on the master member, a trigger pivoted to the shutter casing and having an arm for engaging the latch element on the master member, and adapted to move outwardly to release said latch, a spring for driving the master member and for holding the latch element against the trigger arm, a lug carried by the master member spaced from the latch element thereof having a stop surface and a recessed surface adjacent but offset from each other and extending outwardly from the master member, the end of the trigger arm fitting the recessed surface of the master member lug to be latched thereby when resting therein, and forming a stop for the master member when contacting with the stop surface of the master member lug and a spring for moving the trigger arm down the stop lug into the recess.

2. The shutter trigger lock defined in claim 1 characterized by the arm on the shutter trigger serving as a latch for the master member being movable through a path away from and towards the master member latch element, said trigger arm always lying in the path of the stop surface or recessed surface of the master member lug to limit the movement thereof in any position of the trigger.

3. The shutter trigger lock defined in claim 1 characterized by the master member and the trigger lying in a fixed plane and turning in said plane, the trigger lock and stop being integral parts of these members whereby the trigger arm which latches the master member in a set position is the same part which is locked against movement by the lug of the master member having the stop surface and the recessed surface.

HOWARD T. HODGES.

No references cited.